Aug. 29, 1944.   J. G. ZUBER   2,357,158
PHOTOGRAPHIC CAMERA
Filed May 8, 1943   5 Sheets-Sheet 1

Inventor.
John G. Zuber
By Robert F. Miehle
Atty.

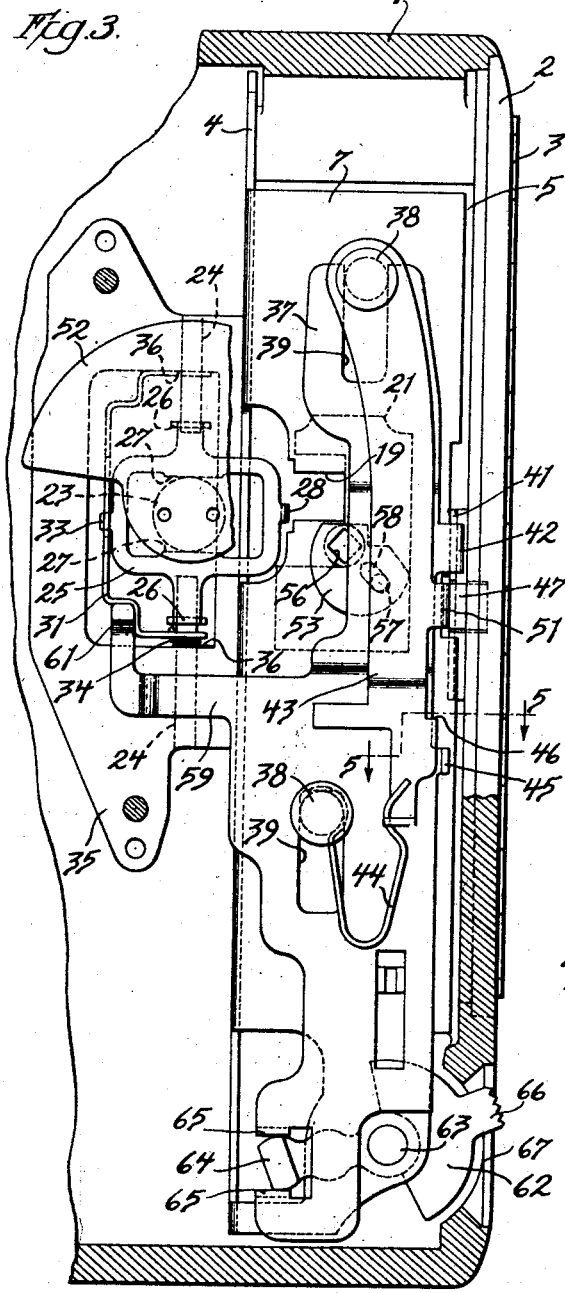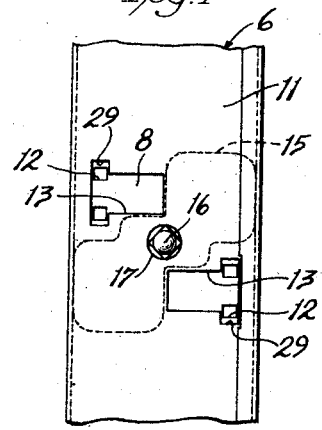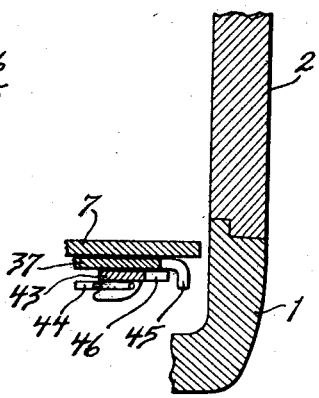

Aug. 29, 1944.   J. G. ZUBER   2,357,158
PHOTOGRAPHIC CAMERA
Filed May 8, 1943   5 Sheets-Sheet 3

Inventor.
John G. Zuber
By Robert F. Miehle
Atty.

Aug. 29, 1944.   J. G. ZUBER   2,357,158
PHOTOGRAPHIC CAMERA
Filed May 8, 1943   5 Sheets-Sheet 4
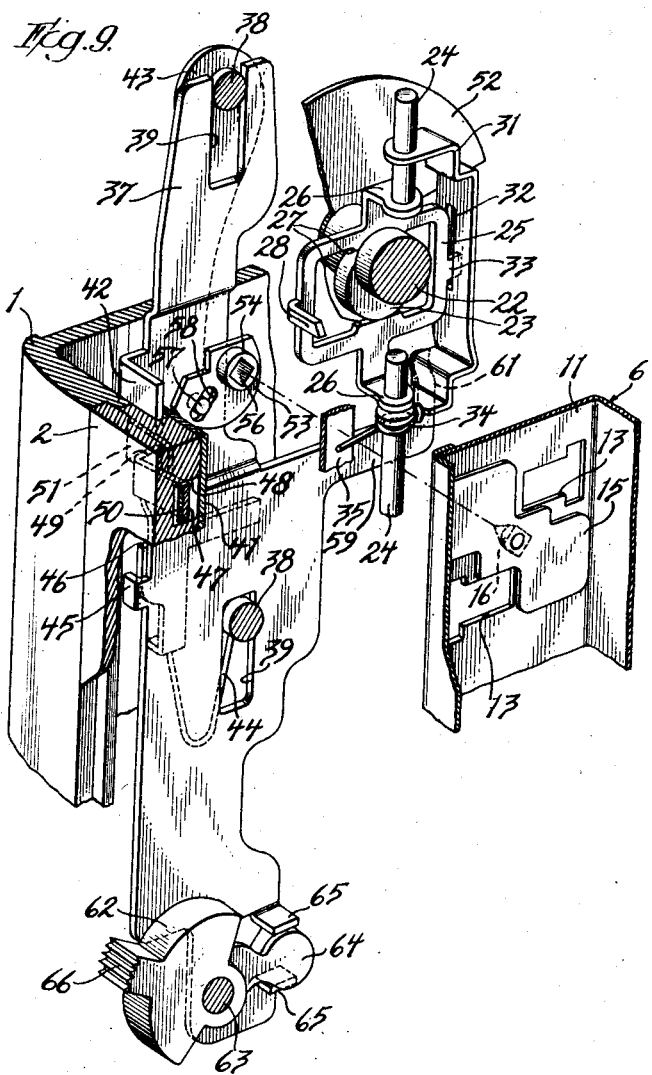
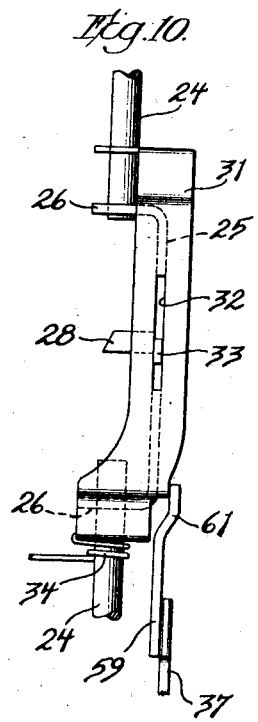
Inventor.
John G. Zuber
BY
Robert H. Michle Jr.
Atty.

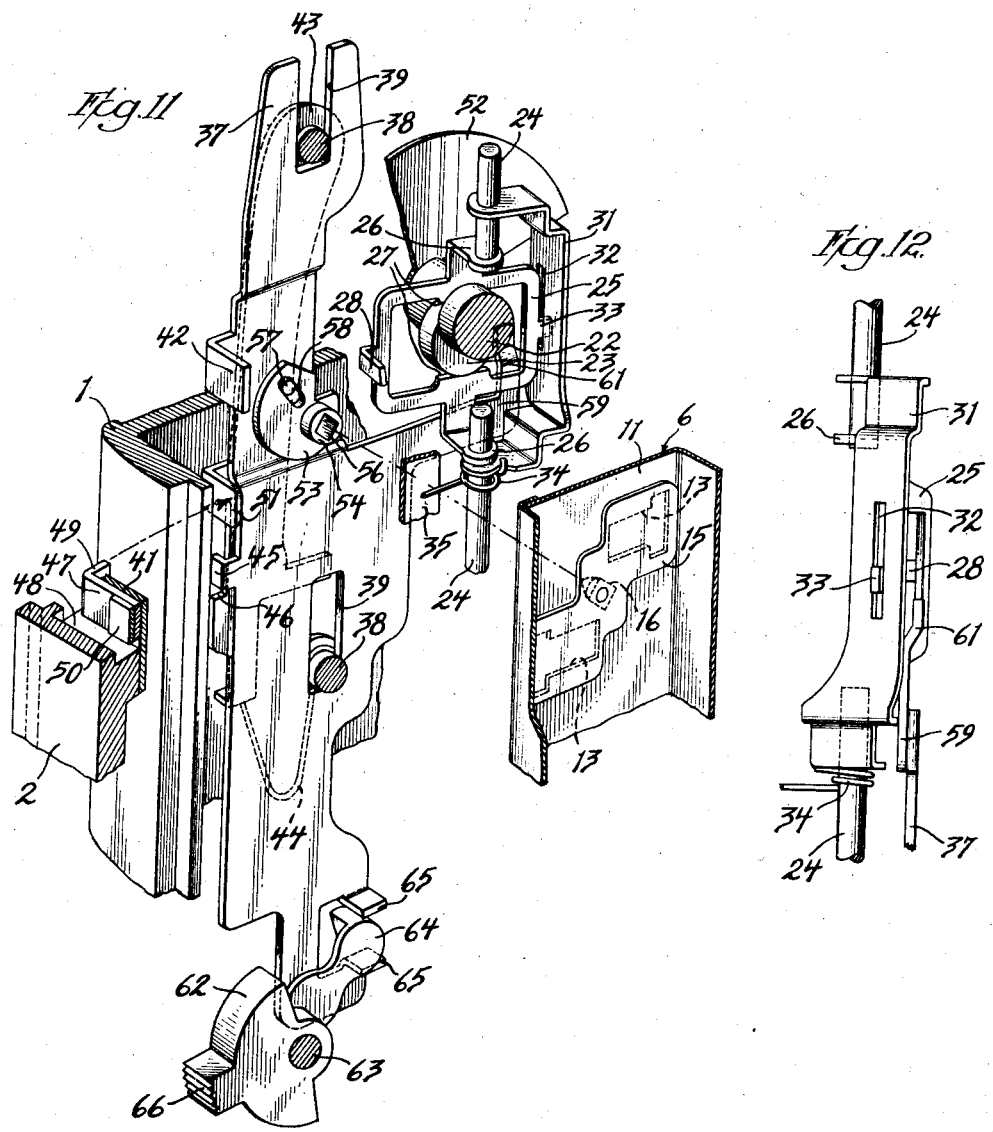

Patented Aug. 29, 1944

2,357,158

UNITED STATES PATENT OFFICE 2,357,158

PHOTOGRAPHIC CAMERA

John G. Zuber, Chicago, Ill., assignor to The Bell & Howell Company, Chicago, Ill., a corporation of Illinois Application May 8, 1943, Serial No. 486,171

10 Claims. (Cl. 88—17)

My invention relates particularly to a photographic camera of the usual motion picture pre-threaded film magazine loading type which utilizes interchangeable magazines carrying sensitized film within the light tight interiors thereof and having the film pre-threaded thereon for cooperation with the camera mechanism to expose the film.

Such a camera is provided with an enclosure forming a film magazine chamber and including a door movable out of closed position to provide access thereinto for the installation and removal of a film magazine and with a film feeding mechanism operative on the film carried by a film magazine in the magazine chamber to feed the film as an incident of exposing the film.

A film magazine for such a camera is usually provided with a light shutter actuable into and out of position closing the exposure opening of the magazine to prevent film exposure at such opening except during photographing, and to provide for actuation of the magazine light shutter while the magazine is enclosed within the magazine chamber of the camera and is thus excluded from light, the camera is provided with magazine light shutter actuating means.

The general object of my invention resides in the provision of novel and effective mechanism, with due regard to compactness, simplicity and accepted design of cameras of the above type, whereby the several operations incident to the installation and removal of the film magazines—such as the latching and unlatching of the door of the enclosure forming the film magazine chamber, the opening and closing of the magazine light shutter and/or the engagement and disengagement of the film feeding mechanism of the camera with the film carried by the magazine—are controlled together, as by a single manually actuated member, to the end that the installation or removal of the film magazines is convenient and that the performance of the aforesaid several operations is assured with a minimum of attention on the part of the user.

The invention will be better understood by reference to the drawings in which—

Figure 3 is a partial sectional front elevational view of the camera shown in Figures 1 and 2;

Figure 4 is a partial front elevation of a film magazine used in the camera;

Figure 5 is a partial sectional view substantially on the line 5—5 of Figure 3;

Figure 9 is a partial sectional perspective view of mechanism of the camera and a film magazine spaced from its normal position with respect thereto;

Figure 10 is a partial side elevational view showing parts of the film feeding mechanism of the camera;

Figure 11 is a view similar to Figure 9 and showing a different position of the mechanism than that in which it is shown in Figure 9; and Figure 12 is a view similar to Figure 10 and showing a different position of the mechanism than that in which it is shown in Figure 10.

Figure 1:
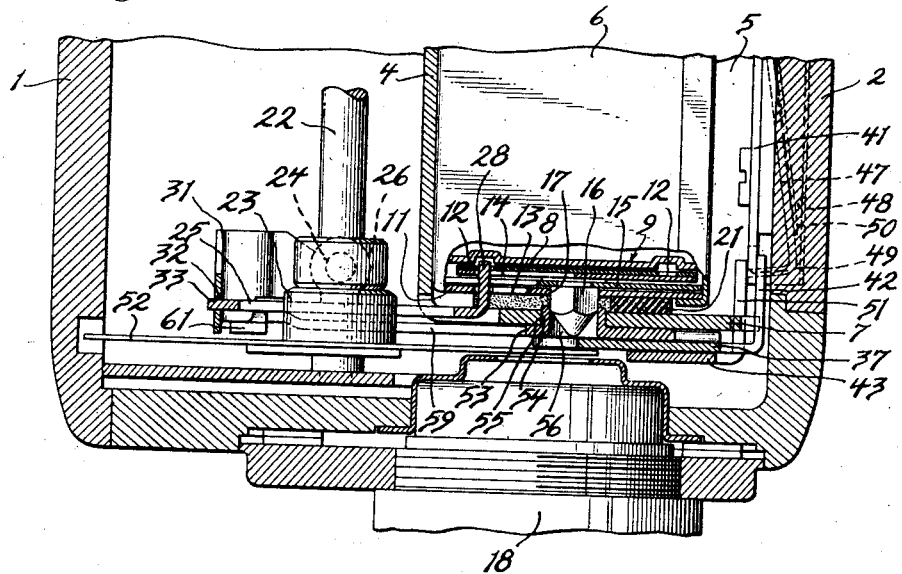
Figure 1 is a partial horizontal cross sectional view of a motion picture camera of the pre-threaded film magazine loading type embodying my invention.

Referring to the drawings, I designates a photographic camera casing which includes a door 2 forming a side thereof and providing access thereinto, the door being hinged at its rear, as designated at 3 in Figure 3, for horizontal facewise movement into and out of closed position. See particularly Figures 1, 2, 3 and 6.

A vertical forwardly and rearwardly extending frame plate 4 is secured within the casing in spaced relation with the door 2 to provide a film magazine chamber 5 between it and the door, the door providing access into the magazine chamber for the insertion and removal of a film magazine 6 and the magazine being predeterminately positioned in the magazine chamber in a usual manner not shown.

The forward portion 7 of the frame plate 4 is disposed at an angle to the main portion of this plate and is disposed vertically and normal to the plane of the door 2 when closed and forms the front wall of the magazine chamber 5.

The film magazine 6, as shown, is of a current commercial type and carries a usual feed perforated motion picture film 8 within the light tight interior thereof, and is provided with an exposure guide 9 parallel to and immediately inward of the front wall 11 thereof through which the film is intermittently fed as an incident of photographing. The magazine, as shown, is also of the usual "double run" type in which one longitudinal section of the film is exposed first, after which the magazine is reversed in the camera and the other longitudinal section of the film is exposed. Accordingly, the film 8 is provided with feed perforations 12, as shown in Figures 1, 2 and 4, along both longitudinal edges thereof for the feeding of the film by the feed mechanism of the camera in either position of the magazine, and the front wall 11 of the magazine is provided with two exposure apertures 13 displaced laterally of the magazine and the exposure guide 9 is provided with two exposure apertures displaced laterally thereof and registering respectively with the openings 13 for the separate exposure of the two longitudinal sections of the film, one of the exposure openings of the exposure guide being shown at 14 in Figures 1 and 2.

Figure 7:
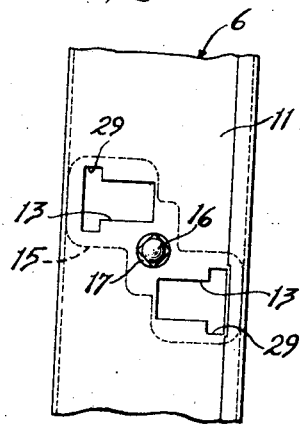
Figure 7 is another partial sectional front elevational view of a film magazine used in the camera.

A light shutter 15 is disposed within the magazine 6 between the front wall 11 and the exposure guide 9 and is pivotally mounted by reason of it being secured on a stud 16 of square cross section which projects through and is rotatably mounted in a bore 17 through the front wall 11 of the magazine and disposed intermediate the exposure apertures 13. As so pivotally mounted, the shutter 15 is movable by actuation of the stud 16 into and out of position closing the exposure apertures 13 and 14. As shown in Figures 2, 7 and 11, the shutter 15 is in closed position preventing exposure of the film 8 at the exposure apertures; and as shown in Figures 1, 4 and 9, the shutter is in open position permitting exposure of the film at the exposure apertures.

Figure 2:
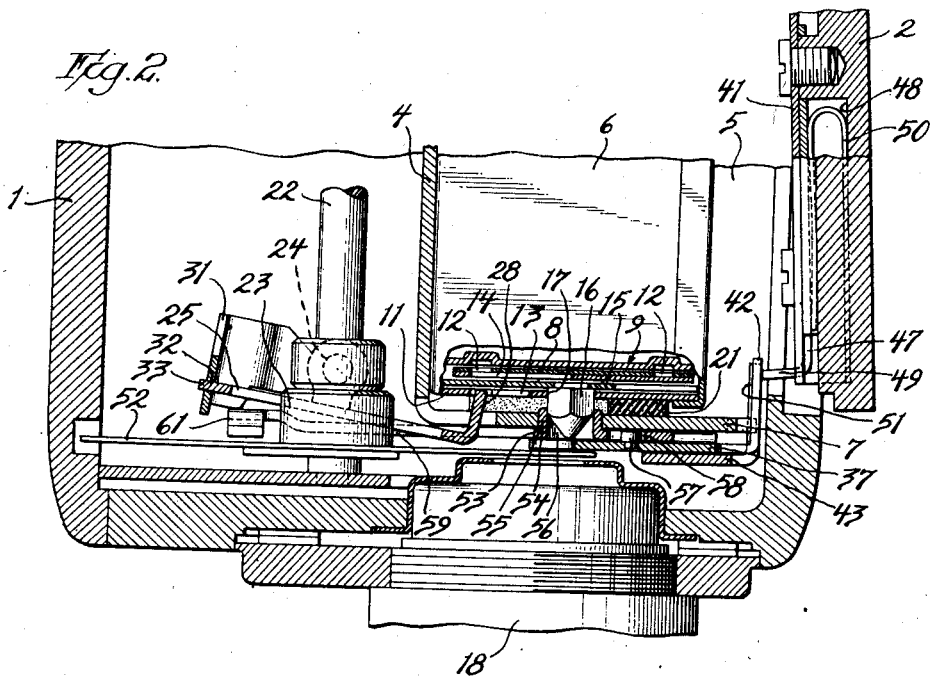
Figure 2 is a view similar to Figure 1 and showing a different position of the mechanism than that in which it is shown in Figure 1.
Figure 6:
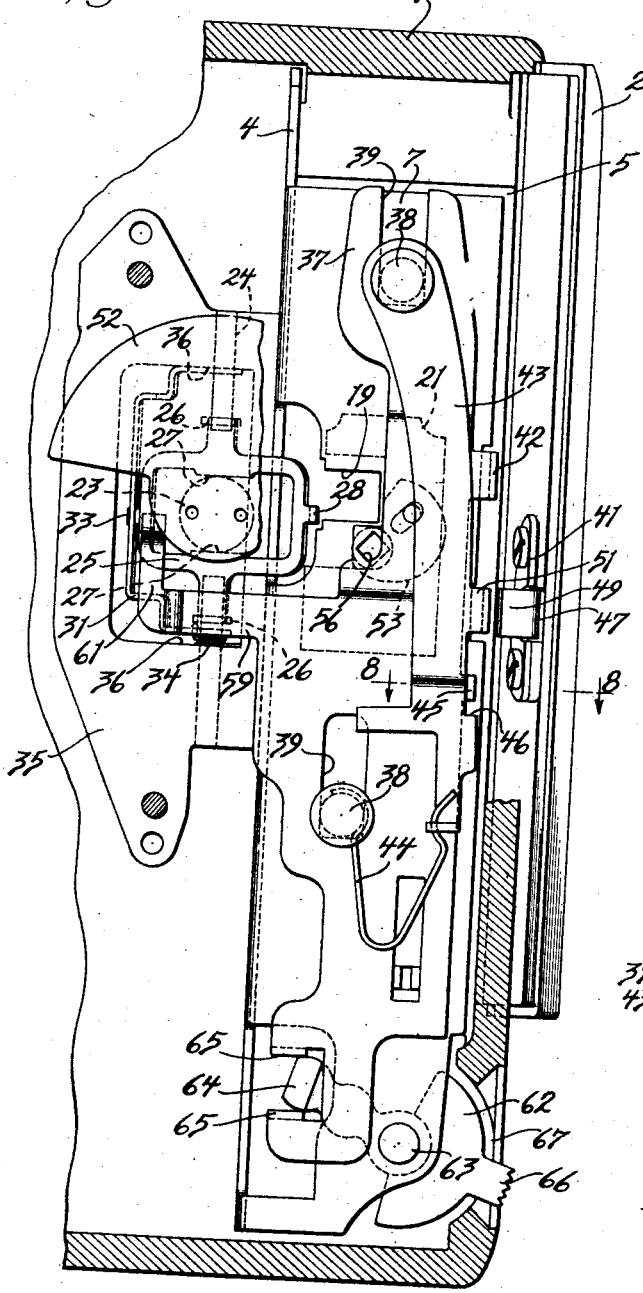
Figure 6 is a view similar to Figure 3 and showing a different position of the mechanism than that in which it is shown in Figure 3.

When the magazine 6 is installed in the magazine chamber 5, the innermost of the exposure apertures 13 and 14 of the magazine are alined with the photographic lens 18 of the camera for photographing, the angle portion 7 of the frame plate 4 being provided with a light opening 19 through which light from the lens passes as shown in Figures 3 and 6, and a pad 21 of yieldable material secured on the rear face of the angle portion 7 of the frame plate 4 excluding any stray light from the outermost of the exposure openings 13 and 14, as shown in Figures 1 and 2.

A forwardly and rearwardly extending rotatably mounted shaft 22 is disposed within the camera on the side of the frame plate 4 opposite that on which the magazine chamber 5 is disposed, and is provided with an eccentric 23 adjacent its forward end. Two vertical, alined and spaced bearing studs 24 are suitably mounted in the camera and are disposed respectively above and below the shaft 22. A film feed shuttle 25 has its main portion of rectangular box form and has bored extensions 26 extending outwardly from the intermediate portions of opposite sides thereof and respectively slidably and pivotally engaged on the bearing studs 24. As so mounted, the shuttle is reciprocatory vertically and is oscillatory transversely of its reciprocatory path, and the eccentric 23 is disposed in the opening of the shuttle and is engaged between opposing vertically spaced bearing portions 27 thereof to effect reciprocation of the shuttle with rotation of the eccentric.

One side of the shuttle 25, which lies in front of the magazine chamber 5, is provided with a rearwardly projecting ratchet tooth 28 laterally spaced from the pivotal axis of the shuttle and engageable and disengageable with feed perforations 12 adjacent the innermost side of the film 8 for intermittently feeding the film vertically in the guide 9 with vertical reciprocation of the shuttle, the outermost portions of the exposure apertures 13 being vertically extended, as designated at 29, and the exposure apertures 14 being correspondingly extended to accommodate the ratchet tooth.

A U-shaped yoke 31 has the bored terminals thereof respectively pivotally engaged on the bearing studs 24 and is thus oscillatory in correspondence with the oscillatory or film engaging and disengaging path of the shuttle, and the intermediate portion of this yoke is provided with a slot 32 parallel to the reciprocatory path of the shuttle. The side of the shuttle 25, opposite that on which the tooth 28 is disposed, is provided with a tongue 33 laterally spaced from the pivotal axis of the shuttle and slidably engaged in the slot 32, so that the yoke 31, as so slidably engaged with the shuttle longitudinally of the reciprocatory or film feeding path of the shuttle, controls the oscillatory or film engaging and disengaging movement of the shuttle.

A torsion spring 34 is engaged about one of the bearing studs 24 and, operative between a frame part 35 of the camera and the yoke 31, yieldably urges the shuttle in its oscillatory path into film engaging position, so that intermittent feed of the film 8 is effected with rotation of the eccentric 23. The yoke 31 and the spring 34 are confined longitudinally of the reciprocatory or film feeding movement of the shuttle between opposing vertically spaced shoulder surfaces 36 of the frame part 35, so that the yoke is stationary with respect to reciprocatory or film feeding movement of the shuttle, this relative movement being accommodated by the sliding engagement between the yoke and the shuttle.

A latch plate 37 within the camera is disposed vertically and normal to the plane of the door 2 in closed position immediately in front of and in parallelism with the angle portion 7 of the frame plate 4, and is mounted for vertical bodily movement in its plane and in a path corresponding with the plane of the door in closed position by means of vertically spaced mounting studs 38 secured on the angle portion 7 of the frame plate 4 and respectively slidably engaged by vertical slots 39 of the latch plate, the latch plate being thus movable in a path corresponding with the path of reciprocation of the shuttle 25. A second latch plate 41 is secured on the inside of the door 2 in parallelism with the plane thereof, and a rearwardly angled latch arm 42 on the latch plate 37 is disposed in parallelism with the plane of the door in closed position and is engageable in back of the door latch plate 41 in the lower position of the latch plate 37 to latch the door in closed position, as shown in Figures 1, 3 and 9, and is disposed out of latching relation with the latch plate 41 in the upper position of the latch plate 37 to permit opening and closing of the door, as shown in Figures 2, 6 and 11, the latch plate 37 being thus movable into and out of latching position.

A lock plate 43 within the camera is disposed vertically and in parallelism with the latch plate 37 immediately in front of this latch plate and is pivotally mounted at its upper end on the upper of the latch plate mounting studs 38 on an axis normal to the plane thereof and to the plane of the latch plate 37 for movement toward and away from the door 2, and a U-shaped spring 44, operative between the lower of the latch plate mounting studs 38 and the lower end of the lock plate, yieldably urges the lock plate in the direction toward the door 2.

Figure 8:
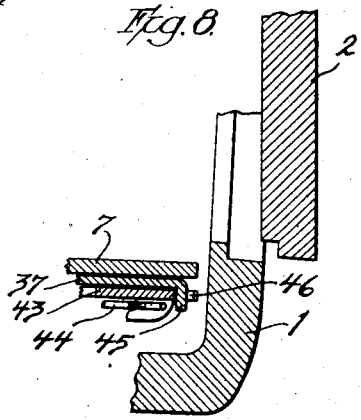
Figure 8 is a partial sectional view substantially on the line 8—8 of Figure 6.

A forwardly angled lock lug 45 on the latch plate 37 overlies the outer edge of the lock plate 43, and an upwardly facing lock shoulder 46 on the outer edge of the lock plate 43 underlies the lock lug 45, when the latch patch 37 is in its upper unlatching position and the lock plate 43 is in its position toward the door 2 under the influence of the spring 44, to lock the latch plate out of latching position, as shown in Figures 6 and 8, movement of the lock plate into its position away from the door against the influence of the spring 44 positioning the lock shoulder 46 out of alinement with the lock lug 45 so that the latch plate 37 may be moved into its lower latching position as shown in Figures 3 and 5.

An abutment member 47 is carried by the door 2, see particularly Figure 2, within a recess 48 on the inner face of the door underneath the door latch plate 41 for movement normal to the plane of the door, and one end of the member 47 is angled outwardly from the inner face of the door to form a projecting abutment lug 49. A U-shaped spring 50 in the recess 48 between the bottom thereof and the abutment member 47 yieldably positions the abutment member in its outermost position. A rearwardly angled abutment lug 51 on the lock plate 43 is alined with the abutment lug 49, so that just before the door 2 reaches its closed position, see Figure 2, the lug 49 abuts the lug 51 and moves the lock plate 43 into its unlocking position to permit the latch plate 37 to be moved into latching position and thus secure the door in closed position, the spring 50 being stronger than the spring 44.

The abutment lug 51 of the lock plate 43 engages against the outer edge of the angle portion 7 of the frame plate 4 to provide a stop limiting unlocking movement thereof so that it does not interfere with any of the mechanism of the camera, such as a usual rotating segmental light shutter 52 secured on the shaft 22, and the spring 50 compresses with final closing movement of the door 2, as shown in Figures 1 and 9, to permit movement of the abutment member 47 to an inner position with respect to the door and thereby to accommodate this limitation of unlocking movement of the lock plate while effecting such unlocking movement just previous to the door reaching its closed position.

A disk-like magazine light shutter controlling member 53 is disposed between the angled portion 7 of the frame plate 4 and the latch plate 37, and is pivotally mounted on an axis normal to the plane of the latch plate and alining with the magazine light shutter stud 16 when the magazine is installed in the magazine chamber 5 by means of rearwardly projecting hub 54 thereof projecting through and rotatably engaging in a bore 55 through the angled portion 7 of the frame plate 4. See Figures 1, 2, 9 and 11. The member 53 is provided with an axial bore 56 of square cross section which is engageable with the magazine light shutter stud 16 so that angular movement of the member 53 effects opening and closing of the magazine light shutter 15.

A stud 57 on the latch plate 37 is pivotally and slidably engaged in a radial slot 58 of the member 53 to form a crank connection between the latch plate and the magazine light shutter controlling member whereby the magazine light shutter 15 is opened and closed respectively with actuation of this latch plate into and out of latching position. See particularly Figures 9 and 11.

Observing that the film feed shuttle 25 is reciprocatory in a path corresponding with the plane of the door 2 in closed position and that the latch plate 37 is movable in parallelism with the path of reciprocation of the feed shuttle, this latch plate is provided with a lateral extension 59 at the inner side thereof which terminates with an upwardly extending cam 61 engaging the controlling yoke 31 at a point radially spaced from the oscillatory axis of the yoke and in opposition to the spring 34, see particularly Figures 9 to 12 inclusive, whereby the film feed shuttle is positioned out of and into film engaging position respectively with actuation of the latch plate 37 out of and into latching position, it being observed that the yoke 31, being stationary with respect to the reciprocatory or film feeding path of the shuttle 25 and with respect to the latching and unlatching path of movement of the latch plate 37, the cam 61 controls the film engaging and disengaging movement of the shuttle throughout the extent of the film feeding movement thereof without necessitating undue movement on the part of the latch plate 37. The film engaging position of the feed shuttle 25 is shown in Figures 1, 3, 9 and 10, and the film disengaged position of the shuttle is shown in Figures 2, 6, 11 and 12.

An actuating lever 62 is pivotally mounted within the camera, as designated at 63, see particularly Figures 3 and 6, on an axis normal to the latch plate 37 and has one end 64 thereof engaged between opposing bearing portions 65 of the latch plate for actuation of the latch plate into and out of latching position with pivotal movement of the lever. The other end 66 of the lever 62 projects through an opening 67 in the camera casing 1 for manual actuation of the latch plate from the exterior of the camera casing.

Installation and removal of the film magazine 6 in the magazine chamber 5 necessarily occurs when the latch plate 37 is out of latching position—that is to say, when it is in its upper position as shown in Figures 2, 6 and 11, in which position it is locked by the lock plate 43 while the door 2 is open. In this position of the latch plate 37, the magazine light shutter controlling member 53 is in magazine light shutter closed position and the feed shuttle 25 is out of film engaging position without attention on the part of the user for the installation or removal of the film magazine.

A film magazine 6 having been installed in the magazine chamber 5 with the light shutter 15 of the magazine in closed position, the door 2 is closed, which results in unlocking the latch plate 37, after which this latch plate is actuated to latching position by means of the actuating lever 62 which results in automatically opening the magazine light shutter and placing the feed shuttle in film engaging position for photographing.

A film magazine is removed from the magazine chamber by actuating the latch plate 37 into unlatching position which results in automatically closing the magazine light shutter and placing the feed shuttle out of film engaging position prior to the removal of the magazine.

While I have thus described my invention, I do not wish to be limited to the precise details described, as changes may be readily made without departing from the spirit of my invention, but having thus described my invention, I claim as new and desire to secure by Letters Patent the following:

1. In a photographic camera, the combination with an enclosure forming a film magazine chamber and including a door movable out of closed position to provide access thereinto for the installation and removal of a film magazine, of a latch member operative to latch said door in closed position and movable into and out of latching position, a lock member operative to lock said latching member out of latching position and movable into and out of locking position, a spring member yieldably urging said lock member into locking position, abutment means operative between said door and lock member to position said lock member out of locking position with closure of said door and comprising a spring urged member, stop means operative to limit movement of said lock member out of locking position, and magazine light shutter actuating means under the control of said latch member and operative to actuate a light shutter of a film magazine in said chamber into open and closed positions respectively with actuation of said latch member into and out of latching position.

2. In a photographic camera, the combination with an enclosure forming a film magazine chamber and including a door movable out of closed position to provide access thereinto for the installation and removal of a film magazine, of a latch member operative to latch said door in closed position and mounted for movement in a path corresponding with the plane of the door in closed position into and out of latching position, a lock member operative to lock said latch member out of latching position and mounted for movement in a path corresponding with that of the opening and closing movement of the door into and out of locking position and yieldably urged into locking position, abutment means operative between said door and lock member to position said lock member out of locking position with closure of said door, and magazine light shutter actuating means under the control of said latch member and operative to actuate a light shutter of a film magazine in said chamber into open and closed positions respectively with actuation of said latch member into and out of latching position.

3. In a photographic camera, the combination with an enclosure forming a film magazine chamber and including a door movable out of closed position to provide access thereinto for the installation and removal of a film magazine, of a latch plate within the camera and operative to latch said door in closed position and disposed normal to the plane of said door in closed position and mounted for bodily movement in its plane and in a path corresponding with the plane of said door in closed position into and out of latching position, a lock plate within the camera and disposed in parallelism with said latch plate and operative to lock said latch plate out of latching position and pivotally mounted on an axis normal to the plane thereof for movement toward and away from said door into and out of locking position, a spring yieldably urging said lock plate into locking position, abutment means operative between said door and lock plate to position said lock plate out of locking position with closure of said door, and magazine light shutter actuating means within the camera and under the control of said latch plate and operative to actuate a light shutter of a film magazine in said chamber into open and closed positions respectively with actuation of said latch member into and out of latching position.

4. In a photographic camera, the combination with an enclosure forming a film magazine chamber and including a door movable out of closed position to provide access thereinto for the insertion and removal of a film magazine, of a latch plate within the camera and operative to latch said door in closed position and disposed normal to the plane of said door in closed position, a mounting carrying said latch plate for bodily movement in its plane and in a path corresponding with the plane of said door in closed position into and out of latching position including a stationary stud disposed normal to said latch plate, a lock plate within the camera and disposed in parallelism with said latch plate and operative to lock said latch plate out of latching position and pivotally mounted on said stud for movement toward and away from said door into and out of locking position, a spring yieldably urging said lock plate into locking position, abutment means operative between said door and lock plate to position said lock plate out of locking position with closure of said door, and magazine light shutter actuating means within the camera and under the control of said latch plate and operative to actuate a light shutter of a film magazine in said chamber into open and closed positions respectively with actuation of said latch plate into and out of latching position.

5. In a photographic camera, the combination with an enclosure forming a film magazine chamber and including a door movable out of closed position to provide access thereinto for the insertion and removal of a film magazine, of a latch plate within the camera and operative to latch said door in closed position and disposed normal to the plane of said door in closed position, a mounting carrying said latch plate for bodily movement in its plane and in a path corresponding with the plane of said door in closed position into and out of latching position including a stationary stud disposed normal to said latch plate, a lock plate within the camera and disposed in parallelism with said latch plate and operative to lock said latch plate out of latching position and pivotally mounted on said stud for movement toward and away from said door into and out of locking position, a spring yieldably urging said lock plate into locking position, stop means operative to limit movement of said lock plate out of locking position, a spring urged abutment member on said door and engageable against said lock plate to position the same out of locking position with closure of said door, a magazine light shutter controlling member within the camera and pivotally mounted on an axis normal to the plane of said latch plate and operable to open and close a light shutter of a film magazine in said chamber, and a crank connection between said latch plate and said shutter controlling member and operative to actuate said shutter controlling member into open and closed shutter positions respectively with actuation of said latch plate into and out of latching position.

6. In a photographic camera, the combination with an enclosure forming a film magazine chamber and including a door movable out of closed position to provide access thereinto for the installation and removal of a film magazine and with a film feeding mechanism including a reciprocatory ratchet toothed feed member engageable and disengageable with feed perforations of a film carried by a magazine in said chamber and yieldably urged into film engaging position, of a latch member operative to latch said door in closed position and movable in parallelism with the path of reciprocation of said feed member into and out of latching position, releasable lock means under the control of said door and operative to lock said latch member out of latching position and to release the same respectively in open and closed positions of said door, and a cam on said latch member and operative to position said feed member out of and into film engaging position respectively with actuation of said latch member out of and into latching position.

7. In a photographic camera, the combination with an enclosure forming a film magazine chamber and including a door movable out of closed position to provide access thereinto for the installation and removal of a film magazine and with a film feeding mechanism including a ratchet toothed feed member reciprocatory in a path corresponding with the plane of said door in closed position and oscillatory transversely of said path of reciprocation into and out of engagement with feed perforations of a film carried by a magazine in said chamber and yieldably urged into film engaging position, of a latch member operative to latch said door in closed position and movable in parallelism with the path of reciprocation of said feed member into and out of latching position, a lock member operative to lock said latch member out of latching position and movable into and out of and yieldably urged into locking position, abutment means operative between said door and lock members to position said lock member out of locking position with closure of said door, a control member oscillatory in correspondence with the oscillatory path of said feed member and slidably engaged therewith longitudinally of the reciprocatory path of said feed member for controlling the film engaging and disengaging movement thereof, and a cam on said latch member and operative on said control member to position said feed member out of and into film engaging position respectively with actuation of said latch member out of and into latching position.

8. In a photographic camera, the combination with an enclosure forming a film magazine chamber including a door movable out of closed position to provide access thereinto for the insertion and removal of a film magazine and with a film feeding mechanism including a ratchet toothed feed member reciprocatory in a path corresponding with the plane of said door in closed position and oscillatory transversely of said path of reciprocation into and out of engagement with feed perforations of a film carried by a magazine in said chamber and yieldably urged into film engaging position, of a latch plate within the camera and operative to latch said door in closed position and disposed normal to the plane of said door in closed position and corresponding with said path of reciprocation of said feed member and mounted for bodily movement in its plane and in a path corresponding with said path of reciprocation of said feed member into and out of latching position, a lock plate within the camera and disposed in parallelism with said latch plate and operative to lock said latch plate out of latching position and pivotally mounted on an axis normal to the plane thereof for movement toward and away from said door into and out of locking position and yieldably urged into locking position, abutment means operative between said door and lock plate to position said lock plate out of locking position with closure of said door, and a cam on said latch plate and operative to position said feed member out of and into film engaging position respectively with actuation of said latch member out of and into latching position.

9. In a photographic camera, the combination with an enclosure forming a film magazine chamber and including a door movable out of closed position to provide access thereinto for the installation and removal of a film magazine and with a film feeding mechanism including a ratchet toothed feed member reciprocatory in a path corresponding with the plane of said door in closed position and engageable and disengageable with feed perforations of a film carried by a magazine in said chamber and yieldably urged into film engaging position, of a latch member operative to latch said door in closed position and movable in parallelism with the path of reciprocation of said feed member into and out of latching position, a lock member operative to lock said latch member out of latching position and mounted for movement in a path corresponding with that of the opening and closing movement of said door into and out of locking position and yieldably urged into locking position, abutment means operative between said door and lock member to position said lock member out of locking position with closure of said door, a cam on said latch member and operative to position said feed member out of and into film engaging position respectively with actuation of said latch member out of and into latching position, and magazine light shutter actuating means under the control of said latch member and operative to actuate a light shutter of the film magazine in said chamber into open and closed positions respectively with actuation of said latch member into and out of latching position.

10. In a photographic camera, the combination with an enclosure forming a film magazine chamber including a door movable out of closed position to provide access thereinto for the installation and removal of a film magazine and with a film feeding mechanism including a ratchet toothed feed member reciprocatory in a path corresponding with the plane of said door in closed position and oscillatory transversely of said path of reciprocation into and out of engagement with feed perforations of a film carried by a magazine in said chamber and yieldably urged into film engaging position, of a latch plate within the camera and operative to latch said door in closed position and disposed normal to the plane of said door in closed position and corresponding with said path of reciprocation of said feed member and mounted for bodily movement in its plane and in a path corresponding with said path of reciprocation of said feed member into and out of latching position, a lock plate within the camera and disposed in parallelism with said latch plate and operative to lock said latch plate out of latching position and pivotally mounted on an axis normal to the plane thereof for movement toward and away from said door into and out of locking position and yieldably urged into locking position, abutment means operative between said door and lock plate to position said lock plate out of locking position with closure of said door, a cam on said latch plate and operative to position said feed member out of and into film engaging position respectively with actuation of said latch member out of and into latching position, a magazine light shutter controlling member within the camera and pivotally mounted on an axis normal to the plane of said latch plate and operable to open and close a light shutter of a film magazine in said chamber, and a crank connection between said latch plate and said shutter controlling member and operative to actuate said shutter controlling member into open and closed shutter positions respectively with actuation of said latch plate into and out of latching position.

JOHN G. ZUBER.